Sept. 29, 1970 E. MÜLLER ET AL 3,531,697
SEMICONDUCTOR ELEMENT FOR SWITCHING PURPOSES
Filed May 23, 1967 2 Sheets-Sheet 1

INVENTORS
Elmar Müller
Klaus Weimann
BY Pierce, Scheffler & Parker
ATTORNEY

SEMICONDUCTOR ELEMENT FOR SWITCHING PURPOSES

Filed May 23, 1967

2 Sheets-Sheet 2

INVENTORS
Elmar Müller
Klaus Weimann
BY Pierce, Scheffler & Parker
ATTORNEYS

United States Patent Office 3,531,697
Patented Sept. 29, 1970

3,531,697

SEMICONDUCTOR ELEMENT FOR SWITCHING PURPOSES

Elmar Müller, Alzey, and Klaus Weimann, Lampertheim, Germany, assignors to Aktiengesellschaft Brown, Boveri & Cie, Baden, Switzerland, a joint-stock company Filed May 23, 1967, Ser. No. 640,729
Claims priority, application Germany, July 2, 1966, B 87,825
Int. Cl. H01l *11/10*
U.S. Cl. 317—235 1 Claim

ABSTRACT OF THE DISCLOSURE

A semiconductor device comprises a semiconductor element divided transversely into at least four zones which alternate in conductivity type. A control electrode is applied to a neighbouring inner zone where this zone reaches to outer surface of one of the outer zones through a perforation in the latter and metallizing is applied to this same surface but set back from the control electrode. The same outer zone also has other perforations distributed therein and the neighboring inner zone extends as far as the metallizing. The perforations in the region of the vicinity of the control electrode are connected to the metallizing either by tongue-shaped metallic strips or by an annular metallic layer. These electrical connections serve to short-circuit the neighboring inner zone to the outer zone and also, upon a flow of anode current after firing, serve to set up a voltage-drop sufficient for firing to spread rapidly at least regionally across the region of the outer zone not covered by the metallizing.

Figure 1:
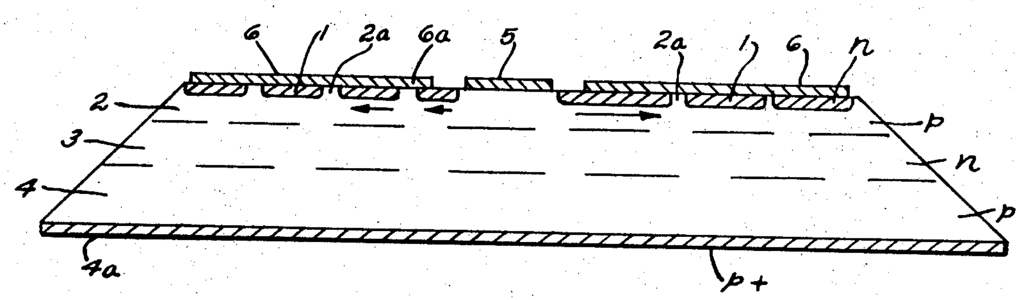

The present invention relates to a semiconductor element for switching purposes provided with at least four zones of alternating types of conductivity, at least one control electrode, surface metallizing on the mutually opposing surfaces of the two outer zones, the metallizing on one outer zone not being disposed in the region in the vicinity of the control electrode, and a plurality of perforations which are distributed in the last-named zone, and in which the neighboring inner zone extends as far as the metallizing.

There is already a known semiconductor element for switching purposes wherein the metallizing on one outer zone is not disposed in the region in the vicinity of the control electrode. This measure—which is also called a transverse-field emitter—causes the anode current to set up across the non-contacted part of the outer zone a voltage-drop which causes firing to spread at relatively high velocity. The semiconductor element can thus tolerate relatively rapid increases of current without destruction. In order that the voltage-drop across the non-contacted outer zone—the emitter—may attain a sufficient magnitude, the width of the non-contacted emitter surface beside the control electrode must not be less than a certain amount. In this connection reference is made to the article in the publication "Applied Physics," vol. 19, page 396, 1965.

There are, furthermore, already known semiconductor elements for switching purposes with a plurality of perforations which are distributed in one outer zone, and in which the neighboring inner zone extends as far as the metallizing which at least partly covers the outer zone—the so-called short-circuited emitter. Such a semiconductor element with a short-circuited emitter exhibits stable temperature behavior, since the inverse currents which increase with rising temperature flow away via the metallizing, and cannot lead to premature firing. Semiconductor elements of the type described above tolerate relatively rapid increases in voltage without the occurrence of undesired firing through (see German patent specification 1,154,872, open to public inspection).

If a semiconductor element is required to be usable with very rapid increases in voltage, the clearances between the individual emiter short-circuits and between the emitter short-circuits and the control electrode must be small. In the case of semiconductor elements which are required to be usable simultaneously for rapid increases in voltage and rapid increases in current, the first few emitter short-circuits in the vicinity of the control electrode must be disposed in a region to which no contact should be made, so that a voltage-drop which is sufficient for firing to spread rapidly is set up across the non-contacted region of the emitter in the vicinity of the control electrode.

Accordingly, it has hitherto also been impossible, in the case of a semiconductor element with a transverse-field emitter, to design the short-circuited emitter so that the semiconductor element may be expected to tolerate very rapid increases in voltage without the occurrence of undesired firing-through.

The present invention stems from the problem of developing such a semiconductor element. According to the invention, a semiconductor element of the type described at the beginning, which has to solve the aforementioned problem, is so designed that perforations disposed in the region in the vicinity of the control electrode are connected in electrically conductive fashion to the remaining metallizing in such a manner that, on the one hand, the inner zone is short-circuited to the outer zone, and that on the other hand, when anode current flows after firing, a voltage-drop which is sufficient for firing to spread rapidly is set up at least regionally across the region of the outer zone not covered by the metallizing. The direction of these voltage drops are indicated by the arrows in FIGS. 1 and 1*a*.

According to an advantageous development of the invention, the perforations in the vicinity of the control electrode are linked by tongue-shaped metal strips to the remaining metallizing on the outer zone. In one practical embodiment, the width of the tongue-shaped metal strips does not exceed the value predetermined by tangents extending along the corresponding perforations at a clearance *d* of about 30$\mu$. It is furthermore advantageous if the tongue-shaped metal strips do not extend more than about 30$\mu$ beyond the perforation towards the control electrode. Such a semiconductor element, wherein a transverse field cannot build up only in the regions in which the tongue-shaped metal strips are disposed, tolerates the voltage increasing more rapidly when the current is increasing as rapidly as in known semiconductor elements with a transverse-field emitter.

In a further advantageous development of the invention, the perforations in the vicinity of the control electrode are connected by a layer of metal to the remaining metallizing on the emitter. The thickness—and thus the resistance—of this metal coating must be made such that, on the one hand, the inner zone is short-circuited to the outer zone, and that on the other hand, when anode current flows after firing, a voltage-drop which is sufficient for firing to spread rapidly is set up across the region of the outer zone not covered by the metallizing.

Reference will now be made to the accompanying drawings, wherein different embodiments of the semiconductor element in accordance with the invention are illustrated. Identical parts have been provided with identical reference numbers.

FIG. 1 shows a section through a semiconductor element, the perforations in the vicinity of the control electrode being connected by tongue-shaped metal strips to the remaining metallizing on the emitter.

Figure 1A:
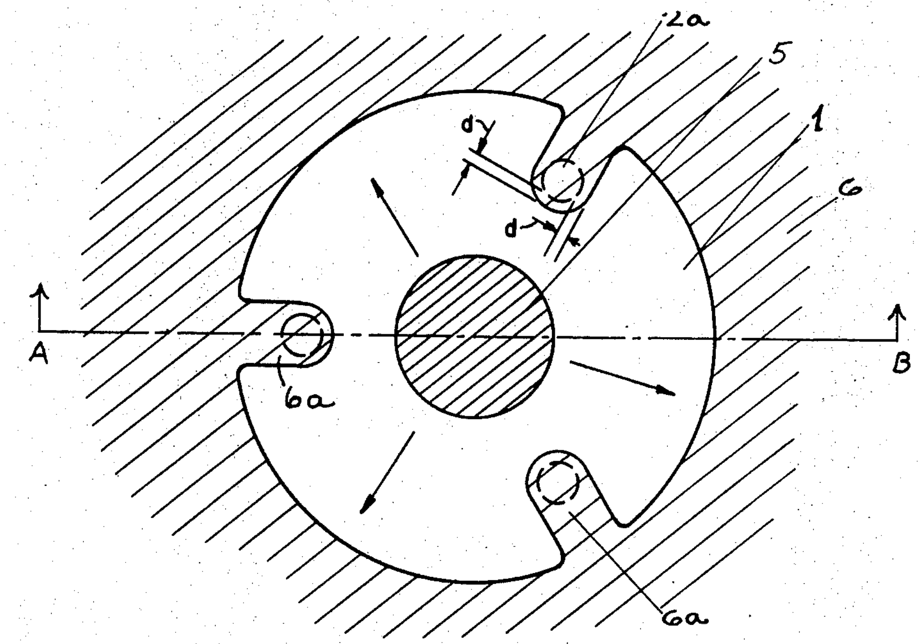
Figure 2:
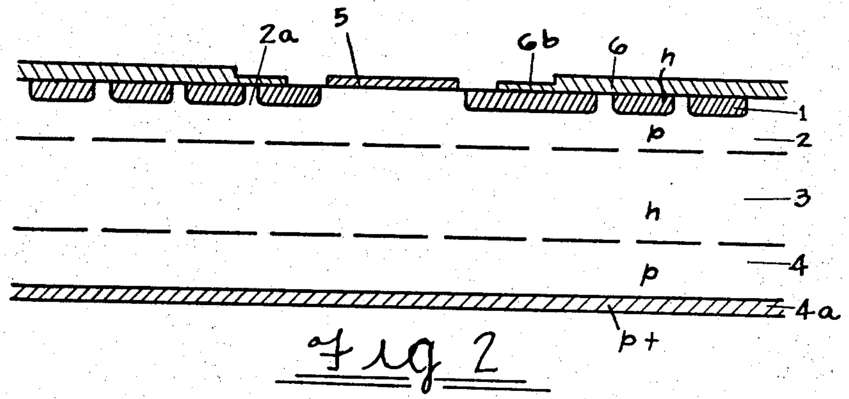
Figure 2A:
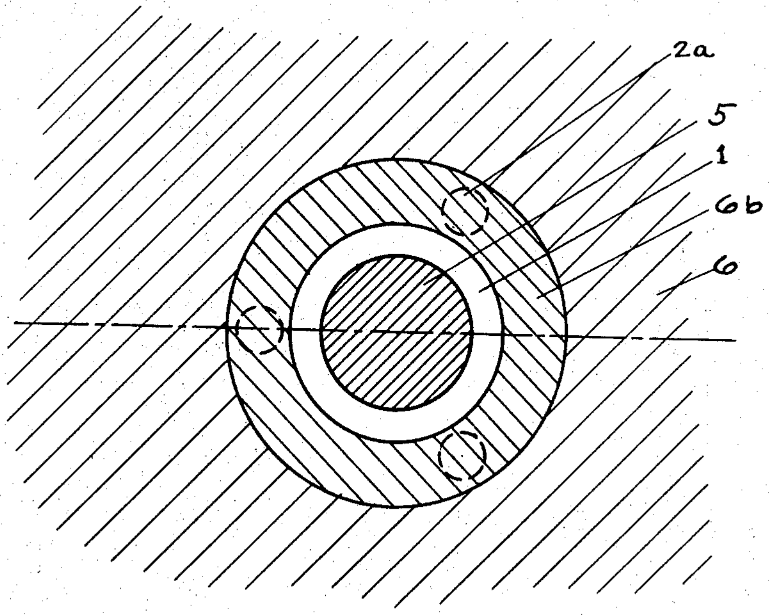

FIG. 1*a* shows a plain view of the semiconductor element according to FIG. 1;

FIG. 2 shows a section through a second embodiment of a semiconductor element, the perforations in the vicinity of the control electrode being connected by a layer of metal to the remaining metallizing on the emitter, and FIG. 2*a* shows a plan view of the semiconductor element according to FIG. 2.

The semiconductor element according to FIG. 1 has four zones of alternating types of conductivity, one outer zone—the emitter 1—with *n* conductivity, the neighboring inner zone —the base 2— with *p* conductivity, a further base 3 with *n* conductivity, and the other outer zone—the collector 4—with *p* conductivity to the neighboring base 3 and *p*+ conductivity in the outer region 4*a*. The metallizing 6 on the emitter 1 is set back with respect to the control electrode 5. This measure provides the transverse-field emitter. The perforation 2*a* in the vicinity of the control electrode is connected to the remaining metallizing 6 on the emitter 1 by a tongue-shaped metal strip 6*a*. This becomes especially clear in the plain view according to FIG. 1*a*.

FIG. 2 shows a semiconductor element which differs from that in FIG. 1 essentially in that the perforations 2*a* in the vicinity of the control electrode 5 are connected by a layer of metal 6*b* to the remaining metallizing 6 on the emitter 1. The thickness of the layer 6*b* is made such, regard being had to the specific resistance of the material used, that on the one hand the base regions 2*a* which it covers are short-circuited to the neighboring emitter regions 1, and on the other hand there is no interference with the development across the emitter region covered by the said layer 6*b* of a voltage-drop which is sufficient for firing to spread rapidly.

Claims to the embodiment illustrated in FIGS. 2 and 2*a* have been transferred to and are now being solicited in a co-pending application filed Feb. 17, 1970.

We claim:

1. In a semiconductor device the combination comprising a wafer of semiconductor material divided transversely into four zones which alternate in conductivity type, one of said outer zones occupying a part of the adjacent front face of the semiconductor wafer, the remaining part of said front face bounding the neighbouring inner zone, said outer zone constituting a traverse field emitter having distributed therein a plurality of perforations and in which the said neighbouring inner zone extends as far as the adjacent front face, a control electrode applied on said front face to said neighbouring inner zone, a metallizing covering a part of said outer zone such that another part of said outer zone neighbouring said control electrode and provided with at least one perforation remains free from said metallizing, and metallic strips connecting said perforations in the region neighbouring said control electrode to said metallizing.

References Cited

UNITED STATES PATENTS

| | | | |
|---|---|---|---|
| 3,263,139 | 7/1966 | Turner | 317—235 |

FOREIGN PATENTS

| | | |
|---|---|---|
| 1,166,940 | 4/1964 | Germany. |

JERRY D. CRAIG, Primary Examiner